April 30, 1957  R. E. KALERT, JR  2,790,458
DRAIN PLUG FOR FLOAT BOWLS
Filed Jan. 31, 1955

INVENTOR.
RALPH E. KALERT JR.
BY George R. Ericson

ATTORNEY

United States Patent Office 2,790,458
Patented Apr. 30, 1957

2,790,458
DRAIN PLUG FOR FLOAT BOWLS

Ralph E. Kalert, Jr., Granite City, Ill., assignor, by mesne assignments, to ACF Industries, Incorporated, New York, N. Y., a corporation of New Jersey Application January 31, 1955, Serial No. 485,196

3 Claims. (Cl. 137—409)

This invention relates to a drain plug for the fuel bowl of a small carburetor such as used on power tools, outboard motors, and the like. More specifically, the invention is a removable rubber plug with self-sealing characteristics, so constructed and arranged as to serve as a closure for a fuel bowl drain opening and as a support for a carburetor float when the fuel bowl is empty.

Present-day fuels for gasoline engines have a decided tendency to form a gummy deposit. If left standing any considerable time, such deposits can seriously affect the proper functioning of movable parts within the fuel bowl, such as the float and needle valve in a carburetor. For this reason, carburetors for power tools, and the like, are often equipped with a spring loaded fitting at the bottom of the fuel bowl, so that the fuel can be drained when the power tool is not in use and may remain idle for an extended period. One of the disadvantages of the present spring loaded fittings is that the operator must expose his hands to contact with the fuel during the operation of the fitting to drain the fuel from the fuel bowl. The other disadvantage is that if the fuel bowl is not drained, the gummy deposit formed by the gasoline during the period in which the tool is idle may interfere with the working of the float valve and float by causing the parts to stick.

The present invention relates to a suitably shaped, self-sealing rubber fitting which may be easily inserted and removed from a drain hole in the fuel bowl by a simple push or pull operation. During the manual operation involved in the simple removal of the plug, no fuel leakage will take place, and there is no necessity to expose the hands to contact with the fuel. When re-inserted after the draining operation, the plug is so shaped as to support the float from contact with the fuel bowl, and so eliminate any possibility of the float becoming stuck to the bowl.

The accompanying drawings illustrate one example of the present invention.

Figure 1:
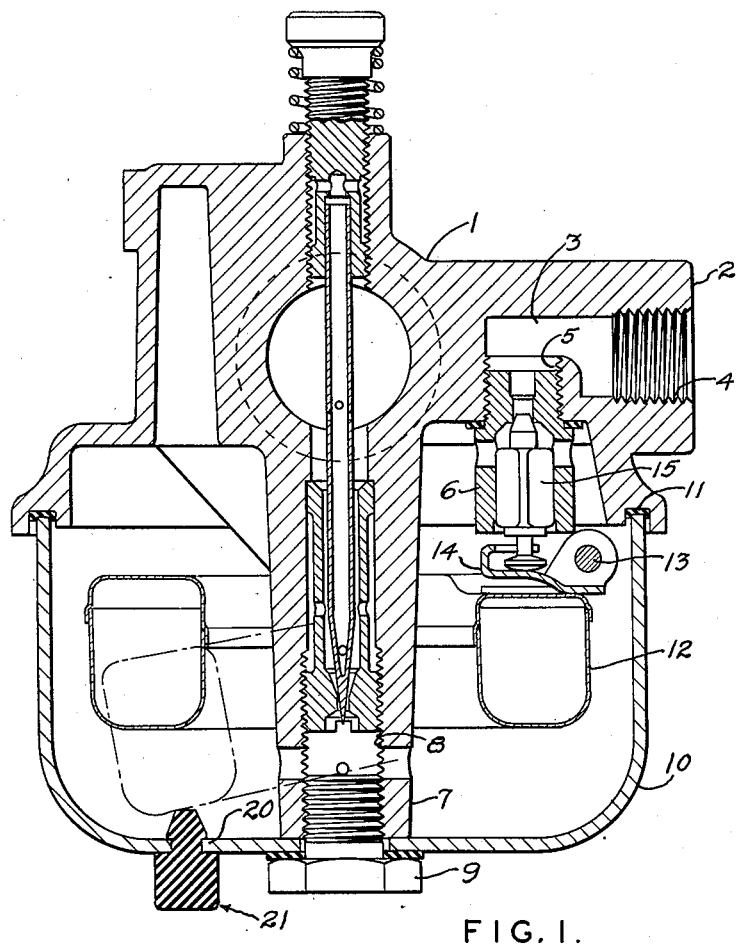
Fig. 1 is an environmental view showing a carburetor, in section, with a float bowl equipped with a rubber drain plug according to this invention.

In Fig. 1, the main body casting of a carburetor 1 has an integral boss 2 containing a passage 3 threaded as at 4 for receiving a connection with a fuel line. The passage 3 has an outlet threaded as at 5 receiving the cage of a needle valve 6.

The main body 1 of the carburetor has an elongated, depending, hollow boss 7 which is suitably internally threaded at 8 to receive a screw threaded plug 9. The boss 7 also contains the main fuel metering devices for the carburetor, but, since these form no part of the present invention, they will not be described in detail. The fuel bowl for the carburetor 10 is tightly secured in place against a gasket 11 on the main body 1 of the carburetor by the screw threaded plug 9.

Within the fuel bowl 10 is a float 12 pivoted at 13 and provided with a finger 14 for operating the needle valve 15 within the needle valve cage 6, all as well known in the art.

Figure 2:
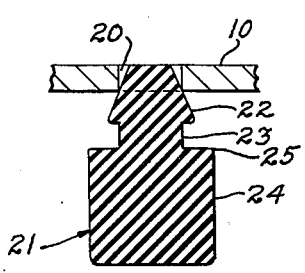
Fig. 2 illustrates, in enlarged section, the shape of the rubber plug before insertion in the drain hole.

In the bottom of the fuel bowl 10 is a drain hole 20 sealed by a rubber plug 21. As shown in Fig. 2, the plug 21 has a frusto-conical shaped head 22 formed on a round stem 23 integral with the generally cylindrical body 24, which serves as a suitable grip for manual operation. The stem 23 is slightly larger in diameter than the drain hole 20, and the distance between head 22 and shoulder 25 is slightly less than the wall thickness of the fuel bowl 10.

Figure 3:
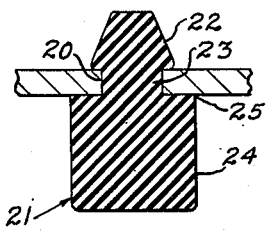
Fig. 3 is an enlarged sectional view of the drain plug in place in the drain.

The normal position of the plug 21 is shown in Fig. 3 on an enlarged scale. In this view it is apparent that sealing action between the stem 23 and drain 20 is obtained by compression of the stem 23 during insertion of the plug 21. Additional sealing action can be obtained between the lower edge of the frusto-conical head 22 and the inner surface of the bowl 10, and shoulder 25 and the undersurface of the fuel bowl, by tension in the stem 23. The material of the plug 21 is soft enough so that, when it is firmly forced into the drain, the material will be distorted sufficiently so that the head 22 is pushed entirely through the drain hole 20.

The plug 21 is so placed, as shown in Fig. 1, that, when the float 12 drops after the fuel is drained, the lower surface of the float will rest upon the upper edge of the head 22 of the plug. This will prevent the possibility of sticking between the lower surface of the float 12 and any gummy deposits formed on the interior surface of the fuel bowl 10.

The plug described serves as an inexpensive device for draining the fuel bowl of a carburetor.

The plug likewise serves as a convenient device for preventing the float from riding on the inner surface of the fuel bowl, thereby preventing adhesion between the two and providing a resilient cushion protecting the float from damage due to vibration.

I claim:

1. In combination, a carburetor having a fuel bowl, a fuel inlet for said bowl, a needle valve in said inlet, a float in said fuel bowl connected to said needle valve, a drain hole in the bottom of said fuel bowl, and a rubber plug secured in said drain hole and so arranged with respect to said float as to serve as a resilient cushion limiting the movement of said float in a downward direction.

2. In combination, a carburetor having a fuel bowl, a fuel inlet for said bowl, a needle valve in said inlet, a float in said fuel bowl connected to said needle valve, a drain hole in the bottom of said fuel bowl, and a rubber plug secured in said drain hole and so arranged with respect to said float as to serve as a resilient cushion limiting the movement of said float in a downward direction, said plug comprising coaxial head and body portions interconnected by a stem portion of relatively small diameter snugly mounted in said drain hole, said head portion being disposed within said bowl and being of gradually increasing diameter from its free end toward said stem portion.

3. In combination, a carburetor having a fuel bowl, a fuel inlet for said bowl, a needle valve in said inlet, a float in said fuel bowl connected to said needle valve, a drain hole in the bottom of said fuel bowl, and a rubber plug secured in said drain hole and so arranged with respect to said float as to serve as a resilient cushion limiting the movement of said float in a downward direction, said plug comprising coaxial head and body portions interconnected by a stem portion of relatively small diameter snugly mounted in said drain hole, said head portion being disposed within said bowl and being of gradually increasing diameter from its free end toward said stem portion, said body portion being of substantially greater diameter and length than said head portion to facilitate manual mounting and removal of the plug relative to the bowl, adjacent ends of said head and body portion having annular shoulders urged into sealing engagement against inner and outer surfaces of the bowl by said stem portion.

References Cited in the file of this patent

UNITED STATES PATENTS

| | | |
|---|---|---|
| 813,683 | Adams | Feb. 27, 1906 |
| 1,915,249 | Jorgensen | June 20, 1933 |
| 2,095,931 | Kraft | Oct. 12, 1937 |